US012516796B2

(12) United States Patent
Guo

(10) Patent No.: US 12,516,796 B2
(45) Date of Patent: Jan. 6, 2026

(54) LIGHT FIXTURE WITH CONVENIENT ASSEMBLING

(71) Applicant: HANGZHOU JUXING INTELLIGENT TECHNOLOGY CO., LTD., Hangzhou (CN)

(72) Inventor: Xinhua Guo, Hangzhou (CN)

(73) Assignee: HANGZHOU JUXING INTELLIGENT TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/977,414

(22) Filed: Dec. 11, 2024

(65) Prior Publication Data

US 2025/0198602 A1 Jun. 19, 2025

(30) Foreign Application Priority Data

Dec. 19, 2023 (CN) ........................ 202323460609.0

(51) Int. Cl.

| | |
|---|---|
| ***F21V 19/00*** | (2006.01) |
| ***F21S 4/10*** | (2016.01) |
| ***F21V 15/01*** | (2006.01) |
| ***F21V 17/00*** | (2006.01) |
| ***F21V 17/10*** | (2006.01) |
| ***F21V 23/00*** | (2015.01) |

(52) U.S. Cl.

CPC .............. *F21V 19/003* (2013.01); *F21S 4/10* (2016.01); *F21V 15/01* (2013.01); *F21V 17/005* (2013.01); *F21V 17/10* (2013.01); *F21V 23/002* (2013.01)

(58) Field of Classification Search

CPC .. F21S 4/10; F21V 7/005; F21V 7/164; F21V 7/16; F21V 19/003; F21V 15/01

See application file for complete search history.

(56) References Cited

U.S. PATENT DOCUMENTS

| | | | | |
|---|---|---|---|---|
| 8,083,381 | B2 * | 12/2011 | Tsai | F21V 17/164 362/249.02 |
| 8,231,261 | B2 * | 7/2012 | Gherardini | F21S 2/005 362/651 |
| 8,240,887 | B2 * | 8/2012 | Daily | F21V 17/14 362/364 |
| 8,651,700 | B2 * | 2/2014 | Peng | F21S 4/10 362/249.06 |
| 12,196,400 | B1 * | 1/2025 | Niu | F21V 17/005 |

* cited by examiner

*Primary Examiner* — James R Greece
*Assistant Examiner* — Michael Chiang
(74) *Attorney, Agent, or Firm* — Schwegman Lundberg & Woessner, P.A.

(57) ABSTRACT

A light fixture with convenient assembling, which includes a base, a circuit board with a light source, a body and a light-transmitting shade. The body and the shade are integrally formed, the circuit board is arranged on a connecting ring and embedded on an inner wall of the body, and the body is embedded on an inner wall of the base. In the disclosure, the shade and the body are provided in an integrated structure, which does not require subsequent adhesive or ultrasonic hot melting assembly and fixation, can simplify an assembly process, and exhibits stable and reliable quality. By providing the circuit board on the connecting ring and providing a guide clamping protrusion and a guide clamping groove, it is convenient to quickly clamp the connecting ring and the circuit board to the base and avoid relative rotation between them, thus ensuring smooth circuit connection.

8 Claims, 6 Drawing Sheets

LIGHT FIXTURE WITH CONVENIENT ASSEMBLING

CROSS-REFERENCE TO RELATED APPLICATION

This non-provisional application claims priority under 35 U.S.C. § 119(a) on Chinese Patent Application No(s). 202323460609.0 filed on Dec. 19, 2023, the entire contents of which are hereby incorporated by reference.

TECHNICAL FIELD

The disclosure relates to the technical field of light fixtures, in particular to a light fixture with convenient assembling.

BACKGROUND ART

Eave lights are mostly used for decorative lighting of exterior wall contours of urban buildings, and can also be used as decorative scene lights in public places or at home, which are widely used and have various structures.

The eaves light is generally composed of a holder, a light source, a body and a light-transmitting shade. In order to ensure safety, an adhesive or ultrasonic hot melting or matching outreaching structure is mostly used between the shade and the body/holder to prevent water vapor from entering interior of the light, but its assembly process is troublesome and its production efficiency is difficult to be improved.

SUMMARY

In view of problems in related art above, a light fixture with convenient assembling is provided in the disclosure, and a shade and a body are provided in an integrated structure, which does not require subsequent adhesive or ultrasonic hot melting assembly and fixation, can simplify an assembly process, and exhibits stable and reliable quality. By providing a circuit board on a connecting ring and providing a guide clamping protrusion and a guide clamping groove, it is convenient to quickly clamp the connecting ring and the circuit board to the base and avoid relative rotation between them, thus ensuring smooth circuit connection; and by providing a first wiring plate, a first clamping groove, a clamping post, a protrusion and a limiting part, the body can be quickly and accurately clamped and connected between the connecting ring and the base, with convenient and efficient assembly and reliable quality, and poor assembly caused by human errors can be avoided.

In order to solve the above technical problems, the disclosure adopts following technical schemes.

A light fixture with convenient assembling includes a base, a circuit board with a light source, a body and a light-transmitting shade.

The body has an annular structure, an end of which is provided with the shade, and the body and the shade are integrally formed.

The circuit board is arranged on the connecting ring, and the connecting ring is of an annular structure with a closed end and its outer wall is embedded on an inner wall of the body in a matched manner.

The body is embedded on an inner wall of the base in a matched manner, and the base is connected in series to a cable, and the cable sequentially passes through the base, the body and the connecting ring and is electrically connected with the circuit board.

As further elaboration of the above technical scheme:

In the above technical scheme, the body includes a positioning part, a limiting part and an assembling part which are arranged in an axial direction. Outer diameters of the assembling part and the positioning part are both smaller than an outer diameter of the limiting part, the shade is integrally formed on the assembling part, two U-shaped first wiring plates and a plurality of clamping posts extending in the axial direction are arranged on an outer wall of the positioning part, and each of the two U-shaped first wiring plates passes through an inner wall of the body at a side thereof and extends to a side of the inner wall of the body, and the plurality of clamping posts are evenly distributed between the two first wiring plates along a circumferential direction.

In the above technical scheme, two annular protrusions are further provided at an inner wall of the body close to the shade in the axial direction, and the two annular protrusions are respectively adapted to the circuit board and the connecting ring.

In the above technical scheme, two second wiring plates are provided on a side wall of the connecting ring, and each of the two second wiring plate penetrates through an inner wall of the connecting ring at a side thereof and is embedded in an inner wall of one of the two first wiring plates in a matched manner, and a positioning post adapted to the circuit board is provided on an inner wall of the closed end of the connecting ring.

In the above technical scheme, an undercut is respectively provided on both sides of each of the two second wiring plates on the side wall of the connecting ring, and a length of the undercut is greater than a width of the first wiring plate.

In the above technical scheme, a plurality of first clamping grooves are provided on an inner wall of a bottom of the first wiring plate, and a plurality of second clamping grooves are matched and provided at an end of the second wiring plate opposite to the inner wall, and each of the plurality of second clamping groove can be matched with one of the plurality of first clamping grooves to form a wire groove capable of accommodating the cable.

In the above technical scheme, the base is of an annular structure with a closed end, a plurality of clamping posts are clamped on an inner wall of the base in a matched manner, two third wiring plates and two or more positioning bored posts are arranged on an outer wall of the base, and each of the two third wiring plates is provided with a plurality of wiring grooves, and each of the plurality of wiring grooves penetrates through an inner wall of the third wiring plate at a side.

In the above technical scheme, a plurality of guide clamping grooves are provided on an inner wall of the closed end of the base, and a plurality of guide clamping protrusions adapted to the plurality of guide clamping grooves in one-to-one correspondence are provided at an outer wall of the closed end of the connecting ring.

Compared with the related art, the disclosure has following beneficial effects: the shade and the body are provided in an integrated structure, which does not require subsequent adhesive or ultrasonic hot melting assembly and fixation, can simplify an assembly process, and exhibits stable and reliable quality. By providing a circuit board on the connecting ring and arranging matched guide clamping protrusions and guide clamping grooves on the connecting ring and the base, it is convenient to quickly clamp the connecting ring and the circuit board to the base and avoid relative rotation between them, thus ensuring smooth circuit connection; by arranging a first wiring plate and the first clamping groove, it is convenient to quickly align and connect the body between the second wiring plate and the second clamping groove of the connecting ring; and by arranging the clamping post, the protrusion and the limiting part, it is convenient to clamp and press the body into the base, and a pressing depth of the body can be limited from its inside and outside to avoid crushing of the light source, with convenient and efficient assembly and reliable quality, and poor assembly caused by human errors can be avoided.

Figure 1:
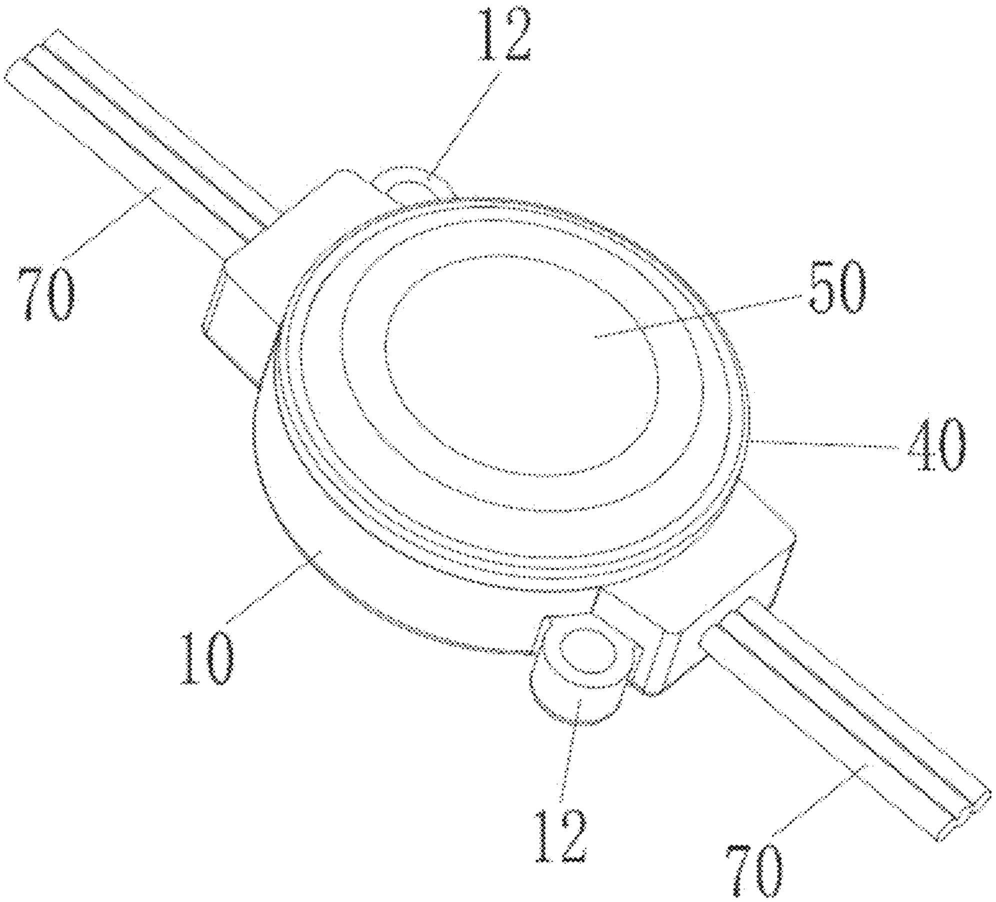
FIG. 1 is a schematic structural view according to an embodiment of the disclosure.

Reference numbers are as follows: 10. Base; 11. Third Wiring Plate; 12. Positioning Bored Post; 13. Guide Clamping Groove; 20. Light Source; 30. Circuit Board; 40. Body; 41. Positioning Part; 42. Limiting Part; 43. Assembling Part; 44. First Wiring Plate; 45. Clamping Post; 46. Protrusion; 47. First Clamping Groove; 50. Shade; 60. Connecting Ring; 61. Second Wiring Plate; 62. Positioning Post; 63. Second Clamping Groove; 64. Guide Clamping Protrusion; 65. Undercut; 70. Cable.

DETAILED DESCRIPTION

The disclosure will be further described in detail with reference to the drawings.

The embodiments described below with reference to the drawings are exemplary and are only intended to explain the present disclosure, but should not be construed as limiting the present disclosure. In description of this disclosure, it should be understood that terms “center”, “longitudinal”, “transverse”, “length”, “width”, “thickness”, “upper”, “lower”, “front”, “rear”, “left”, “right”, “vertical”, “horizontal”, “top”, “bottom” “inside”, “outside”, “clockwise”, “counterclockwise” which indicate an orientation or positional relationship are based on the orientation or positional relationship shown in the drawings, and are merely for convenience of describing the present disclosure and simplifying the description, rather than indicate or imply that the device or element referred to must have a specific orientation, be configured and operated in a specific orientation, and thus cannot be understood as a limitation on the present disclosure. In addition, terms “first” and “second” are only configured for descriptive purposes and cannot be understood as indicating or implying a relative importance, or implicitly indicating a number of indicated technical features. Therefore, features defined with “first” and “second” can include one or more of these features explicitly or implicitly. In description of this disclosure, “several” and “plural” means two or more, unless otherwise specified. In the disclosure, unless otherwise specified and limited, terms “installing”, “coupling”, “connecting” and “fixing” should be understood in a broad sense, for example, it can be “fixedly connecting”, or “detachably connecting” or “integrally connecting”, or it can be “mechanically connecting” or “electrically connecting”, or it can be “directly connecting” or “indirectly connecting through an intermediate medium”, or it can be “communicating within two elements”. For those ordinary skilled in the art, specific meanings of the above terms in this disclosure can be understood according to specific situations. In this disclosure, unless otherwise specified and limited, a first feature being located “above” or “below” a second feature may involve direct contact between the first and second features, or may involve that the first and second features are not in direct contact with each other but in contact through another feature between them. Moreover, the first feature being located “over”, “above” or “on” the second feature may involve that the first feature is directly above and obliquely above the second feature, or only indicate that a level of the first feature is higher than that of the second feature. The first feature being located “under”, “below” or “beneath” the second feature may involve that the first feature is directly below and obliquely below the second feature, or only indicate that a level of the first feature is lower than that of the second feature.

Figure 2:
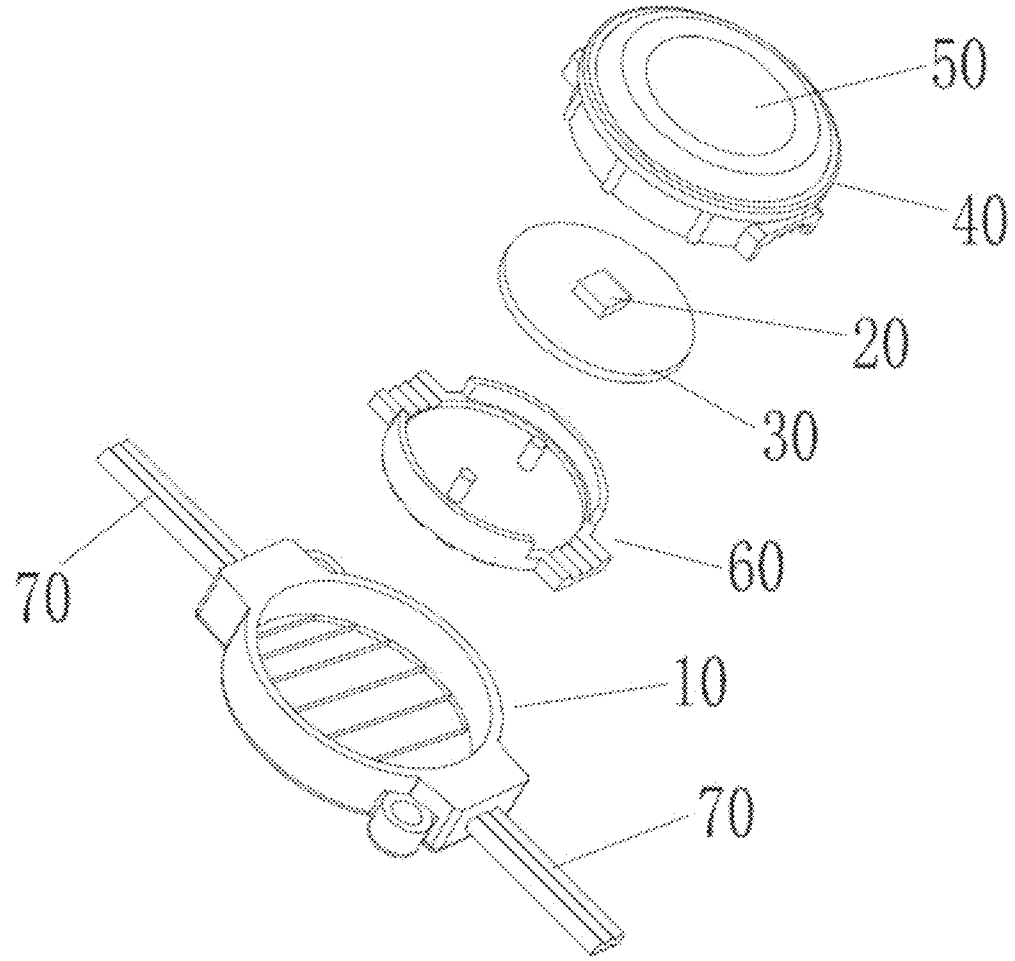
FIG. 2 is a schematic exploded structural view according to an embodiment of the disclosure.

As shown in FIGS. 1 to 2, a light fixture with convenient assembling includes a base 10, a circuit board 30 with a light source 20, a body 40 and a light-transmitting shade 50.

The body 40 has an annular structure, an end of which is provided with the shade 50, and the body 40 and the shade 50 are integrally formed.

The circuit board 30 is arranged on the connecting ring 60, and the connecting ring 60 is of an annular structure with a closed end and its outer wall is embedded on an inner wall of the body 40 in a matched manner.

The body 40 is embedded on an inner wall of the base 10 in a matched manner, and the base 10 is connected in series to a cable 70, and the cable 70 sequentially passes through the base 10, the body 40 and the connecting ring 60 and is electrically connected with the circuit board 30.

In this disclosure, the shade 50 and the body 40 are produced by using an in-mold molding process and the product is integrally molded, which does not require subsequent adhesive or ultrasonic hot melting assembly and fixation, can simplify an assembly process, and exhibits stable and reliable quality.

Figure 3:
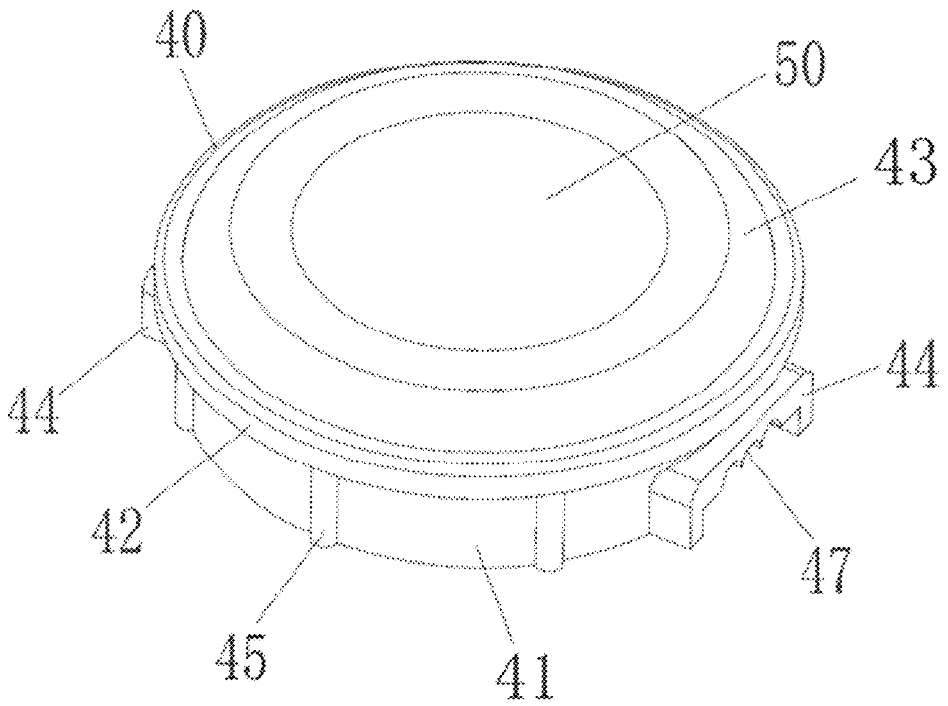
FIG. 3 is a schematic structural view of a body according to an embodiment of the disclosure.
Figure 4:
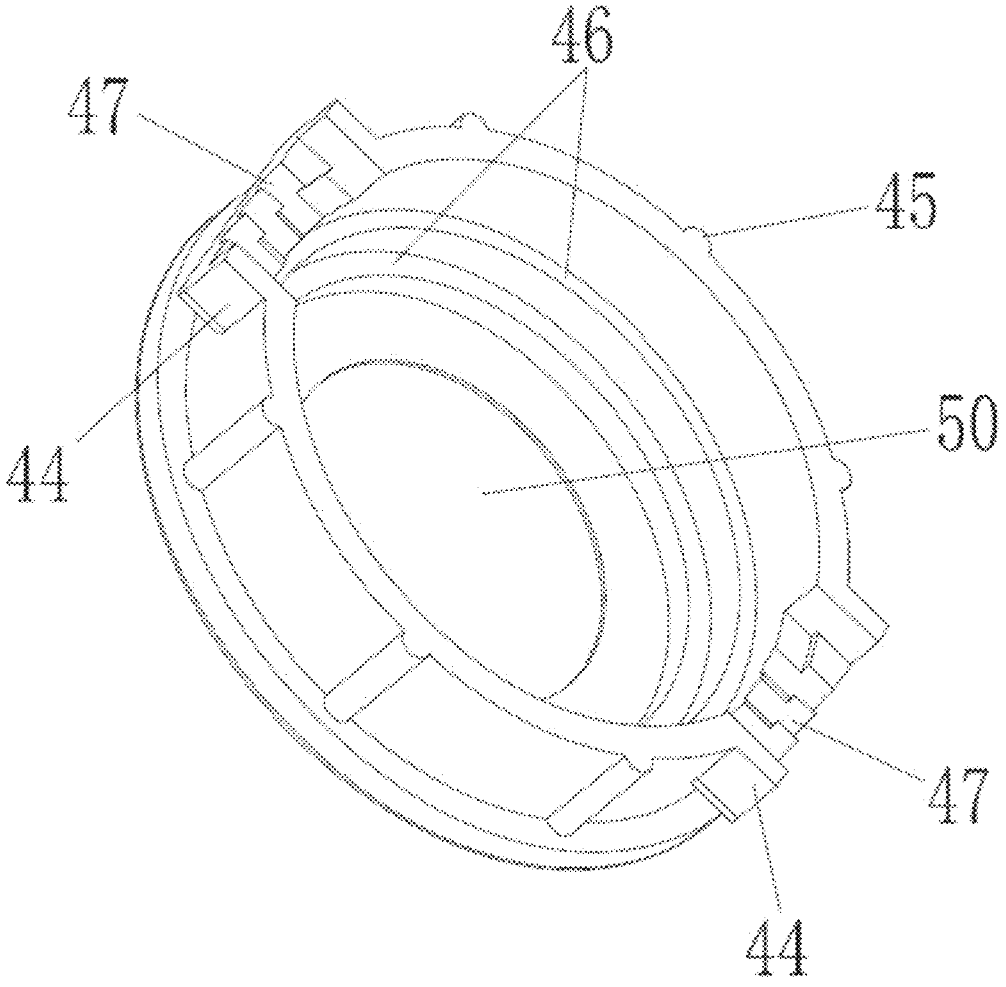
FIG. 4 is a schematic structural view of a body according to an embodiment of the disclosure from another perspective.

Further, as shown in FIGS. 3 to 4, the body 40 includes a positioning part 41, a limiting part 42 and an assembling part 43 which are arranged in an axial direction. Outer diameters of the assembling part 43 and the positioning part 41 are both smaller than an outer diameter of the limiting part 42, the shade 50 is integrally formed on the assembling part 43, two U-shaped first wiring plates 44 and a plurality of clamping posts 45 extending in the axial direction are arranged on an outer wall of the positioning part 41, and each of the two U-shaped first wiring plates 44 passes through an inner wall of the body 40 at a side thereof and extends to a side of the inner wall of the body 10, and the plurality of clamping posts 45 are evenly distributed between the two first wiring plates 44 along a circumferential direction. Two annular protrusions 46 are further provided at an inner wall of the body 40 close to the shade 50 in the axial direction, and the two annular protrusions 46 are respectively adapted to the circuit board 30 and the connecting ring 60.

Figure 5:
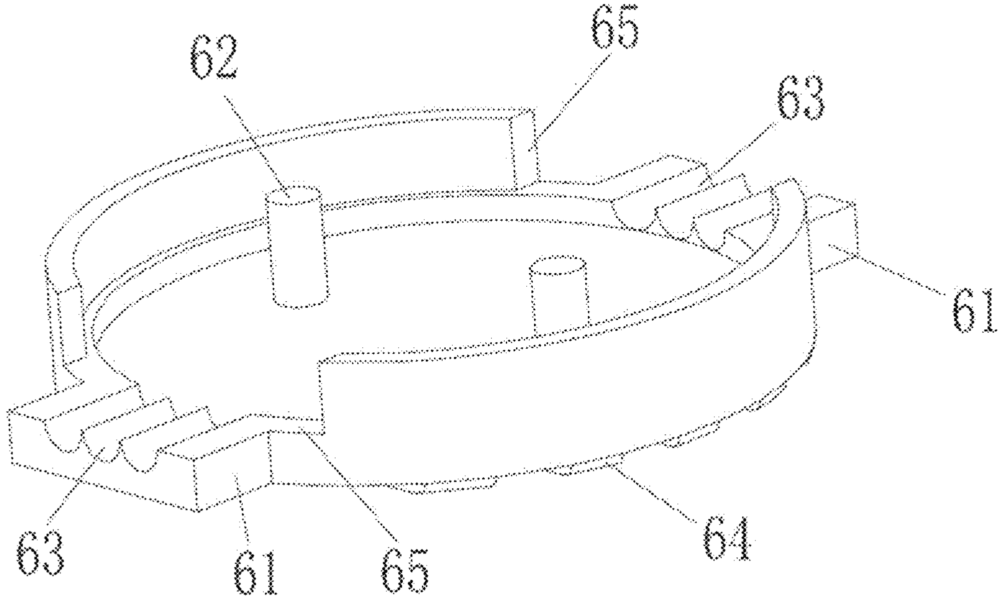
FIG. 5 is a schematic structural view of a connecting ring according to an embodiment of the disclosure.

Further, as shown in FIG. 5, two second wiring plates 61 are provided on a side wall of the connecting ring 60, and each of the two second wiring plate 61 penetrates through an inner wall of the connecting ring 60 at a side thereof and is embedded in an inner wall of one of the two first wiring plates 44 in a matched manner, and a positioning post 62 adapted to the circuit board 30 is provided on an inner wall of the closed end of the connecting ring 60. An undercut 65 is respectively provided on both sides of each of the two second wiring plates 61 on the side wall of the connecting ring 60, and a length of the undercut 65 is greater than a width of the first wiring plate 44.

Further, a plurality of first clamping grooves 47 are provided on an inner wall of a bottom of the first wiring plate 44, and a plurality of second clamping grooves 63 are matched and provided at an end of the second wiring plate 61 opposite to the inner wall, and each of the plurality of second clamping groove 63 can be matched with one of the plurality of first clamping grooves 47 to form a wire groove capable of accommodating the cable 70.

Figure 6:
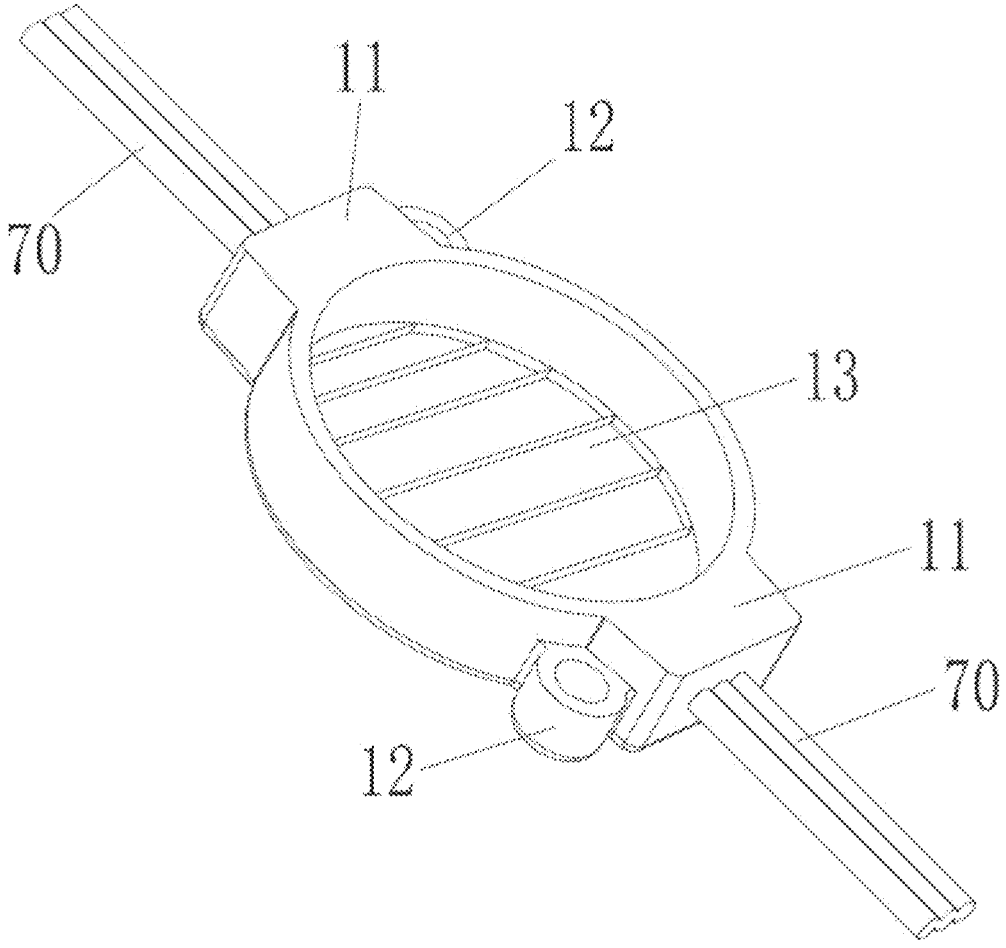
FIG. 6 is a schematic structural view of a base according to an embodiment of the disclosure.

Further, as shown in FIG. 6, the base 10 is of an annular structure with a closed end, a plurality of clamping posts 45 are clamped on an inner wall of the base in a matched manner, two third wiring plates 11 and two or more positioning bored posts 12 are arranged on an outer wall of the base, and each of the two third wiring plates 11 is provided with a plurality of wiring grooves 13, and each of the plurality of wiring grooves 13 penetrates through an inner wall of the third wiring plate 11 at a side.

Further, a plurality of guide clamping grooves 13 are provided on an inner wall of the closed end of the base 10, and a plurality of guide clamping protrusions 64 adapted to the plurality of guide clamping grooves 13 in one-to-one correspondence are provided at an outer wall of the closed end of the connecting ring 60.

In assembling, firstly, the cable 70 is passed through the third wiring plate 11 and is connected with the circuit board 30 to ensure that the circuit is normal. Then, the circuit board 30 is fixed to the positioning post 62 of the connecting ring 60, and the cable 70 in the body is adjusted in orientation to be clamped in the second clamping groove 63, and the guide clamping protrusion 64 is aligned with the guiding clamping groove 13, and the connecting ring 60 is placed in the base 10. Finally, the first clamping grooves 47 of the two first wiring plates 44 on the body 40 are aligned to the second clamping grooves 63, and the body 40 is pressed between the connecting ring 60 and the base 10 until the two protrusions 46 abut against the circuit board 30 and the connecting ring 60 respectively.

In this disclosure, the shade 50 and the body 40 are provided in an integrated structure, which does not require subsequent adhesive or ultrasonic hot melting assembly and fixation, can simplify an assembly process, and exhibits stable and reliable quality. By providing a circuit board 30 on the connecting ring 60 and arranging matched guide clamping protrusions 65 and guide clamping grooves 13 on the connecting ring 60 and the base 10, it is convenient to quickly clamp the connecting ring 60 and the circuit board 30 to the base 10 and avoid relative rotation between them, thus ensuring smooth circuit connection; by arranging a first wiring plate 44 and the first clamping groove 47, it is convenient to quickly connect the body 40 between the connecting ring 60 in alignment; and by arranging the clamping post 45, the protrusion 46 and the limiting part 42, it is convenient to clamp and press the body 40 into the base 10, and a pressing depth of the body 40 can be limited from its inside and outside to avoid crushing of the light source 20, with convenient and efficient assembly and reliable quality, and poor assembly caused by human errors can be avoided.

The above is not intended to limit the technical scope of the disclosure. Any modification, equivalent change and modification of above embodiments by technical essence of the disclosure still all fall within the technical scheme of the disclosure.

What is claimed is:

1. A light fixture with convenient assembling, comprising a base, a circuit board with a light source, a body and a light-transmitting shade, wherein the body has an annular structure, an end of which is provided with the shade, and the body and the shade are integrally formed;

the circuit board is arranged on a connecting ring, and the connecting ring is of an annular structure with a closed end and an outer wall of the connecting ring is embedded on an inner wall of the body in a matched manner; and the body is embedded on an inner wall of the base in a matched manner, and the base is connected in series to a cable, and the cable sequentially passes through the base, the body and the connecting ring and is electrically connected with the circuit board;

wherein the body comprises a positioning part, a limiting part and an assembling part which are arranged in an axial direction, the shade is integrally formed on the assembling part, two U-shaped first wiring plates and a plurality of clamping posts extending in the axial direction are arranged on an outer wall of the positioning part, and each of the two U-shaped first wiring plates passes through an inner wall of the body at a side thereof and extends to a side of the inner wall of the body, and the plurality of clamping posts are evenly distributed between the two first wiring plates along a circumferential direction.

2. The light fixture with convenient assembling according to claim 1, wherein outer diameters of the assembling part and the positioning part are both smaller than an outer diameter of the limiting part.

3. The light fixture with convenient assembling according to claim 2, wherein two annular protrusions are further provided at an inner wall of the body close to the shade in the axial direction, and the two annular protrusions are respectively adapted to the circuit board and the connecting ring.

4. The light fixture with convenient assembling according to claim 2, wherein two second wiring plates are provided on a side wall of the connecting ring, and each of the two second wiring plate penetrates through an inner wall of the connecting ring at a side thereof and is embedded in an inner wall of one of the two first wiring plates in a matched manner, and a positioning post adapted to the circuit board is provided on an inner wall of the closed end of the connecting ring.

5. The light fixture with convenient assembling according to claim 4, wherein an undercut is respectively provided on both sides of each of the two second wiring plates on the side wall of the connecting ring, and a length of the undercut is greater than a width of the first wiring plate.

6. The light fixture with convenient assembling according to claim 4, wherein a plurality of first clamping grooves are provided on an inner wall of a bottom of the first wiring plate, and a plurality of second clamping grooves are matched and provided at an end of the second wiring plate opposite to the inner wall, and each of the plurality of second clamping grooves can be matched with one of the plurality of first clamping grooves to form a wire groove capable of accommodating the cable.

7. The light fixture with convenient assembling according to claim 2, wherein the base is of an annular structure with a closed end, a plurality of clamping posts are clamped on an inner wall of the base in a matched manner, two third wiring plates and two or more positioning bored posts are arranged on an outer wall of the base, and each of the two third wiring plates is provided with a plurality of wiring grooves, and each of the plurality of wiring grooves penetrates through an inner wall of the third wiring plate at a side.

8. The light fixture with convenient assembling according to claim 7, wherein a plurality of guide clamping grooves are provided on an inner wall of the closed end of the base, and a plurality of guide clamping protrusions adapted to the plurality of guide clamping grooves in one-to-one correspondence are provided at an outer wall of the closed end of the connecting ring.

* * * * *